Patented July 25, 1933

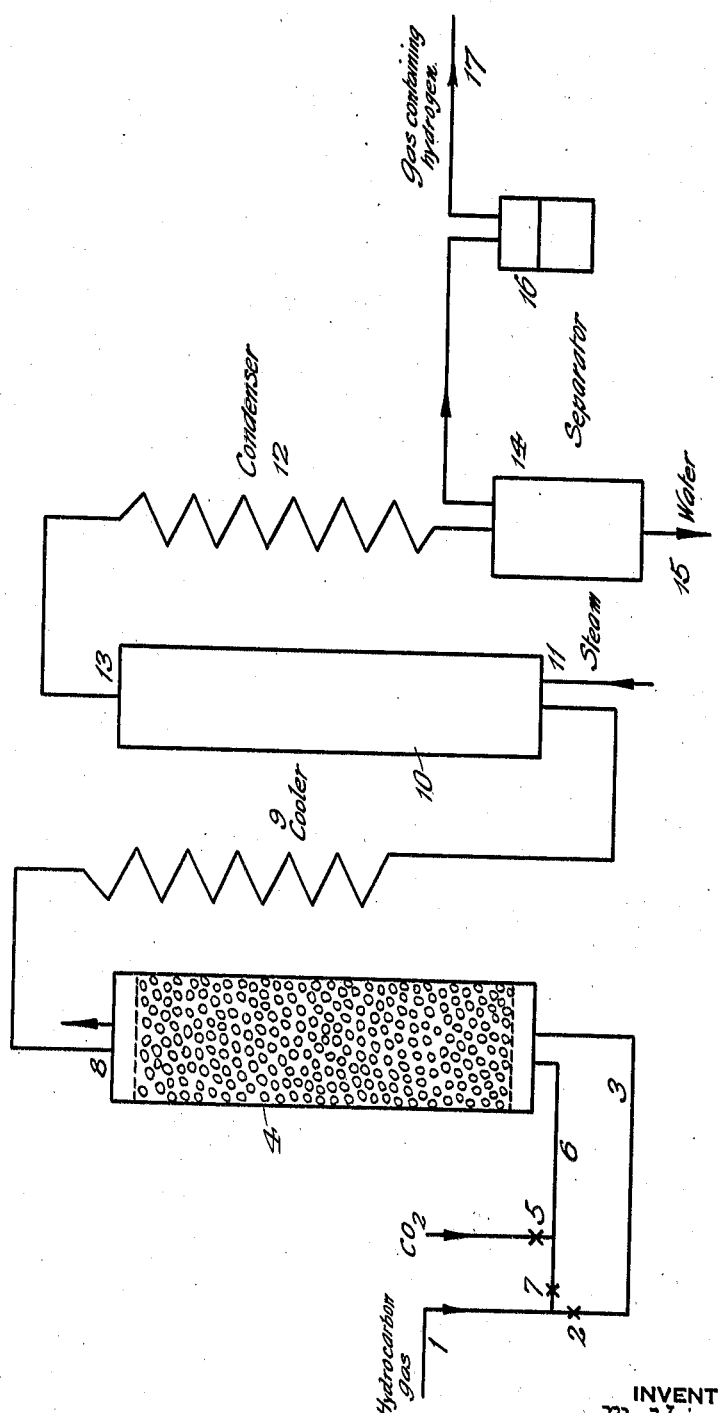

1,919,857

UNITED STATES PATENT OFFICE

MATHIAS PIER, OF HEIDELBERG, AND KARL WINKLER, OF LUDWIGSHAFEN-ON-THE-RHINE, GERMANY, ASSIGNORS, BY MESNE ASSIGNMENTS, TO STANDARD-I. G. COMPANY, OF LINDEN, NEW JERSEY, A CORPORATION OF DELAWARE

DESTRUCTIVE HYDROGENATION OF COALS, TARS, MINERAL OILS, AND THE LIKE

Application filed October 6, 1927, Serial No. 224,519, and in Germany October 14, 1926.

The present invention relates to the destructive hydrogenation of carbonaceous materials; i. e. the production of valuable liquid or other hydrocarbons or derivatives thereof by treating carbonaceous materials, such as solid and liquid fuels, distillation or extraction products thereof and the like, with gases containing or giving rise to hydrogen at elevated temperatures and preferably under pressure with or without the aid of catalysts.

We have found that the said process can be carried out with special advantage with such gases as are obtained by decomposing gases or vapors containing gaseous hydrocarbons at temperatures above 900° C. by interaction with such quantities of substantially pure carbon dioxide that the hydrocarbons are converted mainly into carbon monoxide and hydrogen. All or part of the carbon monoxide formed may be subsequently decomposed catalytically into carbon dioxide and hydrogen by means of water vapor.

The decomposition of the hydrocarbons is advantageously carried out in the presence of catalysts which may be solid as, for example, magnesia with nickel precipitated thereon, or iron alloys or liquid, such as molten iron or alloys thereof.

Preferably the gas mixture rich in hydrocarbons resulting from the destructive hydrogenation of carbonaceous materials is employed as the initial gas for the decomposition described above. It may be desirable to separate valuable compounds, for example the higher hydrocarbons such as ethane, propane and the like, from the gases, if contained in them, prior to their decomposition, for instance, by cooling to low temperatures or by means of porous adsorbents, and to utilize the said compounds for example for chemical purposes, for instance to chlorinate them or to oxidize them to formaldehyde and the like or to convert them at elevated temperatures into olefines, from which other valuable compounds can be manufactured.

Water vapor may be added to the carbon dioxide. If considerable quantities of water vapor are added, conversion of the carbon monoxide formed by the interaction of carbon dioxide and hydrocarbons, into carbon dioxide takes place simultaneously to such an extent that a subsequent decomposition thereof may sometimes be dispensed with.

The mixture of gases containing hydrocarbons and carbon dioxide is heated to at least 900° C. but preferably to 1100° C. or even higher temperatures. When adding air to the said mixture, part of the heat needed is produced by the partial combustion of the hydrocarbons, or other combustible gases contained in the mixture. The decomposition is very advantageously effected in a shaft furnace of high thermal capacity, lined with refractory materials and filled with refractory masses, the said furnace being heated up by the combustion of any combustible gas with oxygen or air. The heating gas may also be replaced by vaporized oil or pulverized coal. The refractory material employed may also be catalytically active. The shaft furnace may also be filled with coke instead of with refractory material, and operated as a producer. In this case, the gases containing hydrocarbons to be decomposed are introduced with carbon dioxide and, if required, with steam or other gases, in the cold blowing stage. The gases of the heating blast stage may be utilized in other ways, for example, for the production of nitrogen for the synthetic manufacture of ammonia.

The requisite carbon dioxide is preferably separated from industrial waste gases.

The invention will be further illustrated with reference to the accompanying drawing showing in a diagrammatic fashion a plant which is particularly suitable for effecting the preparation of hydrogen from the waste gases issuing from the destructive hydrogenation of carbonaceous materials and containing substantial parts of gaseous hydrocarbons.

Referring to this drawing in detail hydrocarbon gas issuing from a destructive hydrogenation plant (not shown) is supplied by way of pipe 1, valve 2 and pipe 3 into the vessel 4 heated to a temperature of about 1100° C. and filled with a suitable refractory material. At the same time carbon dioxide is introduced into this vessel by way of valve 5 and pipe 6. The hydrocarbon gas may also be mixed with the carbon dioxide before entering into the vessel 4. In this case valve 2 is shut off and the hydrocarbon gas passes through valve 7 and intermingles with the carbon dioxide in pipe 6. In vessel 4 the carbon dioxide reacts with the hydrocarbons with the formation of carbon monoxide and hydrogen. The gases then leave vessel 4 at 8 and are cooled in cooler 9 to a lower temperature, whereupon they enter vessel 10 where they are exposed to the action of steam introduced at 11. By this action the carbon monoxide formed in vessel 4 is converted into carbon dioxide with the simultaneous formation of hydrogen from steam. The gases leaving the vessel 10 at 13 are passed through the condenser 12 in which the main part of the superfluous steam is condensed. The condensed water is collected in separator 14 and may be withdrawn at 15. The uncondensed gases are then passed through a vessel 16 in which the carbon dioxide contained in said gases may be removed therefrom by washing under pressure with a suitable solvent. The gas freed from carbon dioxide may be passed back to the hydrogenating plant by way of pipe 17.

The following example will further illustrate how the said invention may be carried into practical effect but the invention is not limited thereto.

*Example*

A gas containing 30 to 40 per cent of methane and obtained in the destructive hydrogenation of coals, tars, or mineral oils at an elevated temperature and under pressure, is mixed with an amount of substantially pure carbon dioxide corresponding to the methane content, so that a gas mixture having, for example, the composition $CO_2$ 23.6 per cent, $H_2$ 52 per cent, $CH_4$ 22.5 per cent, $N_2$ 1.3 per cent and $CO$ 0.6 per cent is formed. This gas is passed at a temperature of about 1100° centigrade through a shaft furnace lined with refractory material and filled with refractory masses on which metals with catalytic properties, such as nickel, have been deposited if desired.

The furnace is heated up, for example, by burning a gas obtained in the aforesaid destructive hydrogenation and having the following approximate composition:—$CH_4$ 10 per cent, $N_2$ 6 per cent, $CO_2$ 0.8 per cent, the remainder being hydrogen. A portion of the gas mixture which is to be converted, and has the compositon specified above, may also be employed as the heating agent.

On passing the aforesaid initial gas mixture over the highly heated refractory material, a gas mixture containing $CO$ 31.4 per cent, $H_2$ 66.2 per cent, $CO_2$ 1.1 per cent and $N_2$ 1.3 per cent is obtained. By treatment with steam at about 500° centigrade and under any convenient pressure, the carbon monoxide can be completely converted into carbon dioxide and hydrogen in a second stage, the carbon dioxide being washed out under pressure before the gases are used.

What we claim is:

1. In the destructive hydrogenation of carbonaceous substances such as solid and liquid fuel, distillation and extraction products thereof, into valuable liquid and other hydrocarbons and derivatives thereof by treatment with a gas containing hydrogen, the step which comprises subjecting waste gas issuing from the said hydrogenation and containing gaseous hydrocarbons to decomposition by interaction with a gas essentially containing carbon dioxide in such an amount that the gaseous hydrocarbons are converted mainly into hydrogen and carbon monoxide by reaction with said carbon dioxide at a temperature above 900° C. and using the gas thus obtained in the said hydrogenation.

2. In the destructive hydrogenation of carbonaceous substances such as solid and liquid fuel, distillation and extraction products thereof, into valuable liquid and other hydrocarbons and derivatives thereof by treatment with a gas containing hydrogen, the step which comprises subjecting waste gas issuing from the said hydrogenation and containing gaseous hydrocarbons to decomposition by interaction with a gas essentially containing carbon dioxide in such an amount that the gaseous hydrocarbons are converted mainly into hydrogen and carbon monoxide by reaction with said carbon dioxide at a temperature above 900° C., converting the carbon monoxide formed by means of steam into carbon dioxide and hydrogen, removing the carbon dioxide and using the gas thus obtained in the said hydrogenation.

3. In the destructive hydrogenation of carbonaceous substances such as solid and liquid fuel, distillation and extraction products thereof, into valuable liquid and other hydrocarbons and derivatives thereof by treatment with a gas containing hydrogen the step which comprises subjecting waste gas issuing from the said hydrogenation and containing gaseous hydrocarbons to decomposition by interaction at a temperature above 900° C. with such a quantity of a gas consisting essentially of carbon dioxide as to convert the hydrocarbons mainly into hydrogen and carbon monoxide, converting the carbon monoxide formed by means of steam into carbon dioxide and hydrogen, removing the carbon dioxide and using the gas thus obtained in the said hydrogenation.

4. In the destructive hydrogenation of carbonaceous substances such as solid and liquid fuel, distillation and extraction products thereof, into valuable liquid and other hydrocarbons and derivatives thereof by treatment with a gas containing hydrogen, the step which comprises passing waste gas issuing from the said hydrogenation and containing gaseous hydrocarbons with a gas essentially containing carbon dioxide in such an amount that the gaseous hydrocarbons are converted mainly into hydrogen and carbon monoxide by reaction with said carbon dioxide over refractory masses heated to above 900° C., converting the carbon monoxide formed by means of steam into carbon dioxide and hydrogen, removing the carbon dioxide and using the gas thus obtained in the said hydrogenation.

5. In the destructive hydrogenation of carbonaceous substances such as solid and liquid fuel, distillation and extraction products thereof, into valuable liquid and other hydrocarbons and derivatives thereof by treatment with a gas containing hydrogen, the step which comprises passing waste gas issuing from the said hydrogenation and containing gaseous hydrocarbons with a gas essentially containing carbon dioxide in such an amount that the gaseous hydrocarbons are converted mainly into hydrogen and carbon monoxide by reaction with said carbon dioxide over refractory masses heated to above 900° C. and carrying nickel, converting the carbon monoxide formed by means of steam into carbon dioxide and hydrogen, removing the carbon dioxide and using the gas thus obtained in the said hydrogenation.

6. In the destructive hydrogenation of carbonaceous substances such as solid and liquid fuel, distillation and extraction products thereof, into valuable liquid and other hydrocarbons and derivatives thereof by treatment with a gas containing hydrogen, the step which comprises passing waste gas issuing from the said hydrogenation and containing gaseous hydrocarbons with a gas essentially containing carbon dioxide in such an amount that the gaseous hydrocarbons are converted mainly into hydrogen and carbon monoxide by reaction with said carbon dioxide over coke heated to 1100° C., converting the carbon monoxide formed by means of steam into carbon dioxide and hydrogen, removing the carbon dioxide and using the gas thus obtained in the said hydrogenation.

7. In the destructive hydrogenation of carbonaceous substances such as solid and liquid fuel, distillation and extraction products thereof, into valuable liquid and other hydrocarbons and derivatives thereof by treatment with a gas containing hydrogen, the step which comprises subjecting waste gas issuing from the said hydrogenation and containing gaseous hydrocarbons to decomposition by interaction with a gas essentially containing carbon dioxide in such an amount that the gaseous hydrocarbons are converted mainly into hydrogen and carbon monoxide by reaction with said carbon dioxide at a temperature above 900° C., steam being added with said gas to convert the carbon monoxide formed into carbon dioxide and hydrogen, removing the carbon dioxide and using the gas thus obtained in the said hydrogenation.

MATHIAS PIER.
KARL WINKLER.